United States Patent
Sasaki

[11] Patent Number: 6,039,342
[45] Date of Patent: Mar. 21, 2000

[54] AUTOMOTIVE AIR BAG DEVICE

[75] Inventor: Tsuneo Sasaki, Omiya, Japan

[73] Assignee: Kansei Corporation, Japan

[21] Appl. No.: 09/058,909

[22] Filed: Apr. 10, 1998

[30] Foreign Application Priority Data

Apr. 11, 1997 [JP] Japan .................................... 9-093442

[51] Int. Cl.$^7$ ................................................ B60R 21/20
[52] U.S. Cl. ........................................................ 280/728.3
[58] Field of Search ........................... 280/728.3, 728.2, 280/732

[56] References Cited

U.S. PATENT DOCUMENTS

| | | | |
|---|---|---|---|
| 5,031,930 | 7/1991 | Sato .......................................... | 280/732 |
| 5,482,313 | 1/1996 | Ikeya et al. .......................... | 280/728.2 |
| 5,520,411 | 5/1996 | Lang et al. ............................ | 280/728.3 |
| 5,741,024 | 4/1998 | Enders .................................. | 280/728.3 |
| 5,816,608 | 10/1998 | Tanabe .................................. | 280/728.2 |
| 5,865,461 | 2/1999 | Totani et al. .......................... | 280/728.3 |

Primary Examiner—Brian L. Johnson
Assistant Examiner—Tony Winner
Attorney, Agent, or Firm—Morrison Law Firm

[57] ABSTRACT

An automotive air bag device avoids disengagement or play between the air bag activation unit and the lid, which covers the air bag inflation opening, during transportation to an automobile assembly plant and after the air bag device has been installed in a vehicle. Extending from the back surface of the lid, is an integrally formed attachment piece. The air bag activation unit has a number of hook members that engage support openings in the attachment piece. A thin, elastic tongue piece, integrally formed on the upper edge of each support opening, prevents disengagement of the hook member.

5 Claims, 4 Drawing Sheets

AUTOMOTIVE AIR BAG DEVICE

BACKGROUND OF THE INVENTION

The present invention relates to an automotive air bag device and, more particularly, to an automotive air bag device having a unique lid for both covering an air bag inflation opening, formed in an automotive panel member such as an instrument panel or a door panel, and for supporting an air bag activation unit attached to the back surface thereof.

Referring to FIG. 5, a conventional automotive air bag device 4 includes an air bag inflation opening 1a in an automotive instrument panel 1. Air bag inflation opening 1a is covered by a lid 2, formed of a thermoplastic resin, mounted on instrument panel 1. An air bag activation unit 3, fastened to lid 2, is mounted on a steering support member (not shown in the drawing).

A pair of integrally formed attachment pieces 2b, 2b, oriented along the longitudinal axis of the vehicle, project from a back surface 2a of lid 2 in opposed relation to each other. A plurality of support openings 2c, 2c (only two are shown in the drawing) are formed at a number of positions on attachment pieces 2b, 2b.

Air bag activation unit 3 includes a substantially rectangular metal guide 6 and a substantially cylindrical diffuser 9. An inflator 10 is housed in diffuser 9. An air bag 11 is folded and stored in guide 6. Outwardly opened hook members 5, 5, are on the outer wall of guide 6. Diffuser 9 is attached to guide 6 by a bolt 7 and a nut 8. Air bag 11 is inflated by gas that is generated when inflator 10 is activated.

First, the air bag activation unit 3 is assembled. Then, attachment pieces 2b, 2b of lid 2 are resiliently displaced outwardly, and guide 6 is pushed toward the back surface of lid 2 while hook members 5, 5 are positioned inward from attachment pieces 2b, 2b. The ends of hook members 5, 5 then project through and engage support openings 2c, 2c. Thus, air bag activation unit 3 is temporarily attached to lid 2.

The assembled unit (air bag module) comprising lid 2 and air bag activation unit 3 is transported to an automobile assembly plant or the like, where the assembled unit is inserted into the air bag inflation opening 2a from the front of instrument panel 2. Clips or the like (not shown in the drawing) are used to position lid 2 relative to air bag inflation opening 1a of instrument panel 1. Then, air bag activation unit 3 is fixed to the steering support member so that hook members 5, 5 are in contact with a lower edge 2d of support openings 2c, 2c.

In the conventional automotive air bag device 4 described above, lid 2 and air bag activation unit 3 are connected by engaging hook members 5, 5 with slot-shaped support openings 2c, 2c. This allows lid 2 to be easily connected to air bag activation unit 3. However, this can result in disengagement or play between lid 2 and air bag activation unit 3 when the assembled unit is being transported to an automobile assembly plant or after the air bag device has been installed in a vehicle.

OBJECTS AND SUMMARY OF THE INVENTION

It is an object of the present invention to overcome the problems described above by providing an automotive air bag device that avoids disengagement or play between the air bag activation unit and the lid which covers the air bag inflation opening, both during transport to an automobile assembly plant and after installation in a vehicle.

This object is achieved by an automotive air bag device wherein a resin lid covers an air bag inflation opening in an automotive panel member. An integrally formed attachment piece extends from the back surface of the lid. An air bag activation unit has at least one hook member that engages at least one support opening in the attachment piece.

Before the air bag inflation opening is covered by the lid, the lid is fastened to the air bag activation unit. A thin elastic tongue piece, integrally formed on the edge of the support opening, prevents disengagement of the hook member.

According to an aspect of the invention, an automotive air bag device for installation in an opening in an automotive panel member comprises an air bag activation unit, a lid adapted to cover the air bag inflation opening and to support the air bag activation unit, a pair of opposed attachment pieces projecting from the back of the lid, and means for urging the air bag activation unit away from the lid and into engagement with the attachment pieces.

Briefly stated, the attachment pieces have at least one support opening and the air bag activation unit has at least one hook member adapted for engagement therewith; and an elastic tongue piece on an edge of at least one of the support openings contacts the hook member when the hook member is engaged with the support opening so as to resist disengagement and play between the hook member and the support member.

According to an aspect of the invention, in an automotive air bag device, of the type which includes a lid and an air bag activation unit fastened thereto, the lid having an attachment piece defining at least one support opening, the air bag activation unit having at least one hook member adapted for engagement with the at least one support opening, there is provided an elastic tongue piece, on an edge of at least one of the support openings, in contact with the at least one hook member, when the hook member is engaged with the support opening, so as to resist disengagement or play between the hook member and the support member.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
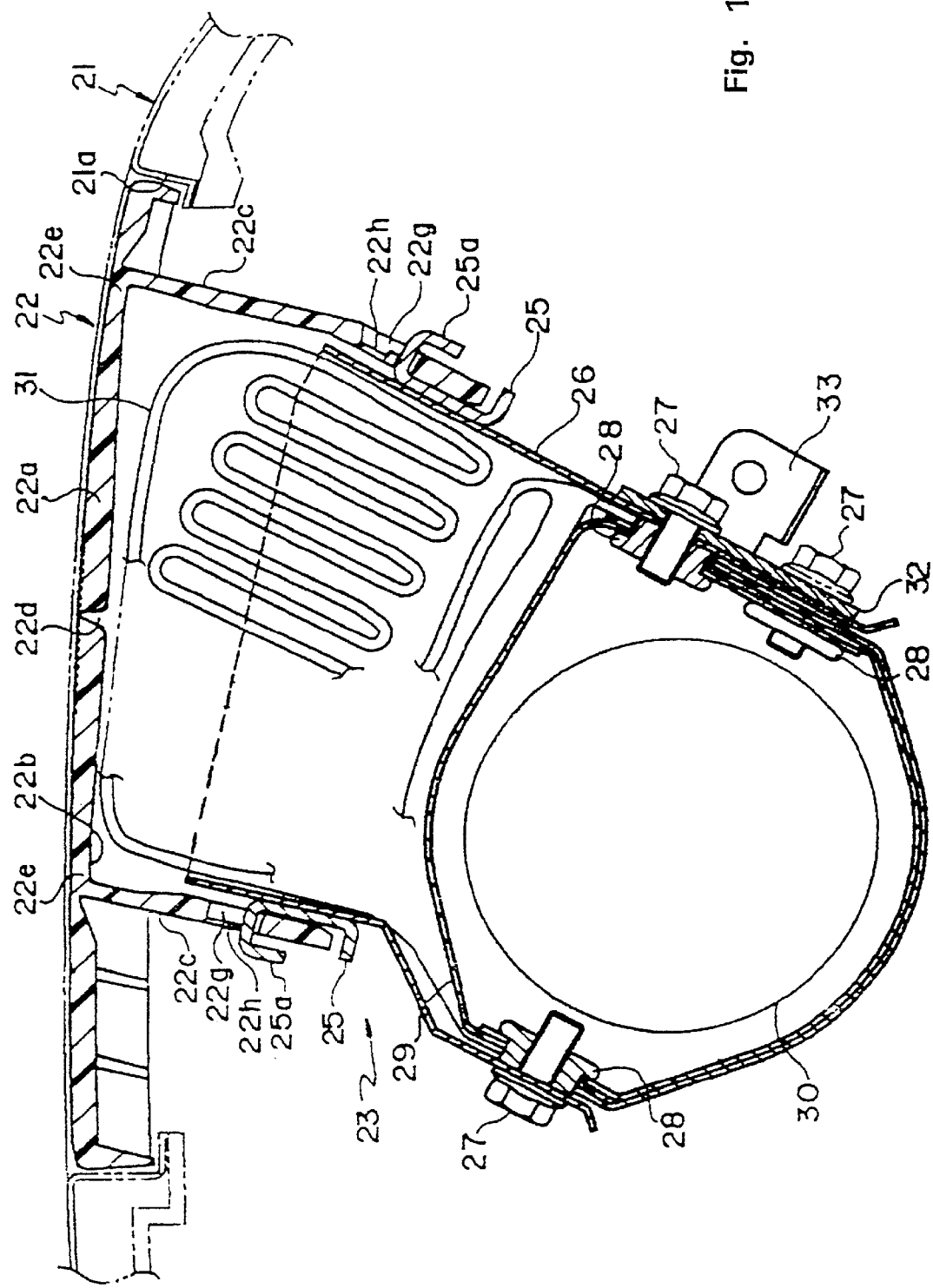
FIG. 1 is a cross-section view showing an automotive air bag device according to an embodiment of the present invention.
Figure 2:
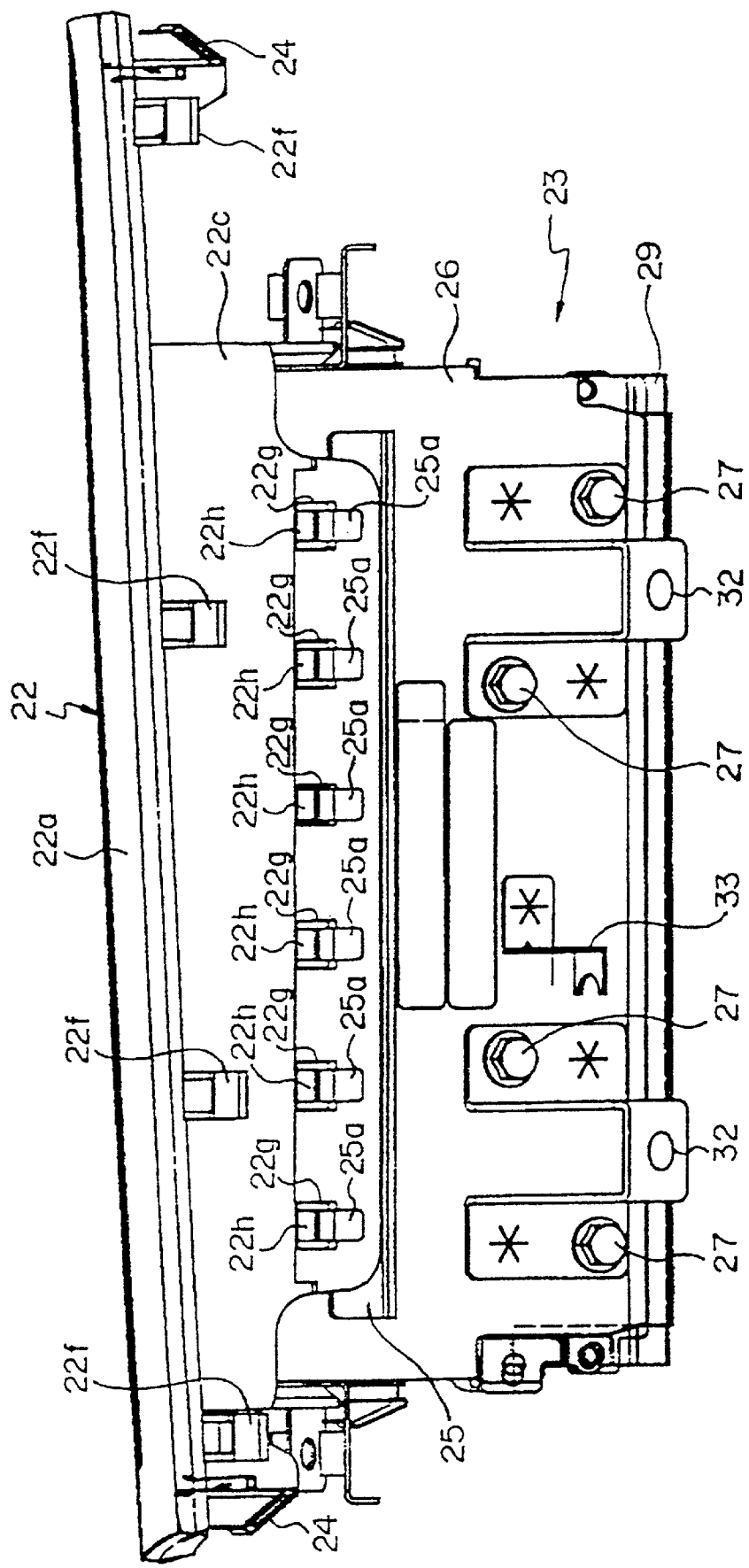
FIG. 2 is a side view of the air bag device of FIG. 1.

Referring now to FIGS. 1 and 2, there is shown an instrument panel 21. A lid 22, made from a thermoplastic resin, covers an air bag inflation opening 21a in instrument panel 21. An air bag activation unit 23 is supported by lid 22. In this embodiment, lid 22 and air bag activation unit 23 are disposed on the back or inner surface of instrument panel 21, which is oriented upward in the vehicle.

Lid 22 includes a plate-shaped main lid unit 22a covering air bag inflation opening 21a, and integrally formed, opposed attachment pieces 22c, 22c, which project from a back surface 22b of main lid unit 22a. Attachment pieces 22c, 22c are oriented along the longitudinal axis of the vehicle.

On back surface 22b of main lid unit 22a, a scoreline 22d is positioned between attachment pieces 22c, 22c in the shape of the letter H when seen from the front. A plurality of engagement claws 22f, on main lid unit 22a, engage the edges of air bag inflation opening 21a. Additional clips 24 are disposed on main lid unit 22a to fasten lid 22 to instrument panel 21.

Figure 3A:
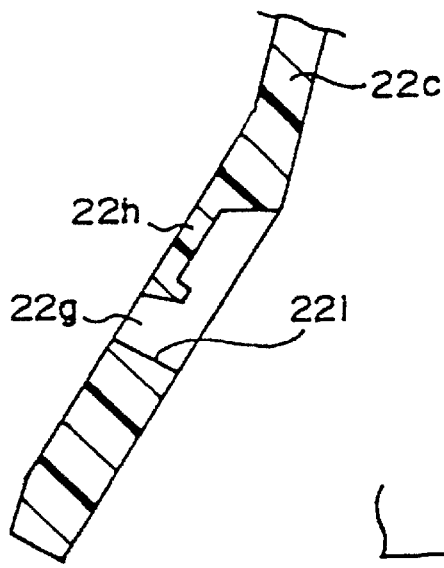
FIG. 3(A) is a first fragmentary, enlarged view of the attachment piece of FIGS. 1 and 2.

A number of support openings 22g, 22g are formed in attachment piece 22b. Referring to FIGS. 3(A), (B), thin elastic tongues 22h, 22h are integrally formed on the upper edges of support openings 22g, 22g.

Air bag activation unit 23 includes a number of hook members 25, 25 welded to an outer surface of a substantially rectangular metal guide 26. An inflator 30 is housed in a substantially cylindrical diffuser 29. An air bag 31 is folded and stored in guide 26. Hook members 25, 25 have outwardly opened hooks 25a, 25a. Diffuser 29 is attached to guide 26 by a bolt 27 and a nut 28. Air bag 31 is inflated by pressurized gas generated when inflator 30 is activated.

Brackets 32, 33, welded to the outer wall of guide 26, fasten air bag activation unit 23 to a steering support member or the like (not shown in the drawings). Bracket 32 also serves as a reinforcement member for mounting bolt 27 and nut 28.

Lid 22 and air bag activation unit 23 are joined in the following manner. Once air bag activation unit 23 has been assembled, attachment pieces 22c, 22c are resiliently displaced outwardly, while hook members 25, 25 are positioned between attachment pieces 22c, 22c. Guide 26 is then pushed toward back surface 22b of lid 22.

Figure 4A:
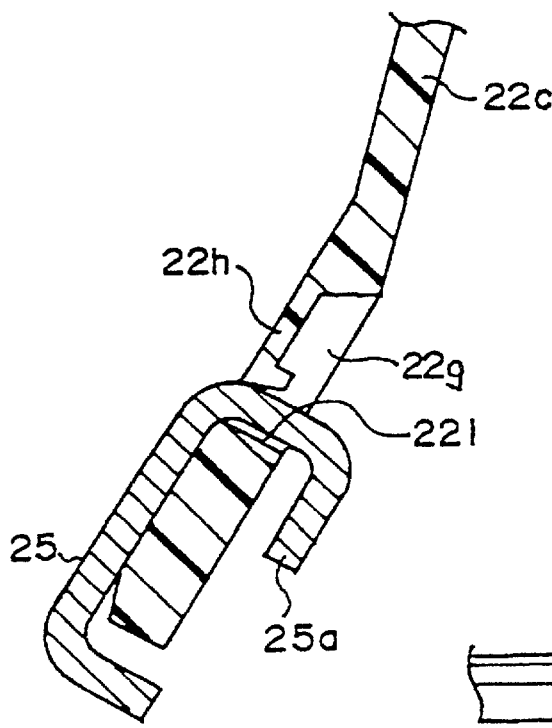
FIG. 4(A) is a first fragmentary, enlarged view of the attachment piece when engaged with the hook member.
Figure 4B:
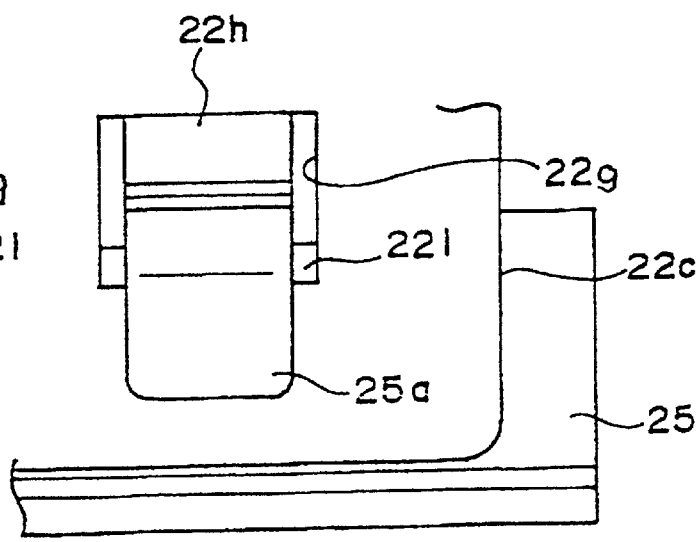
FIG. 4(B) is a second fragmentary, enlarged view of the attachment piece when engaged with the hook member.
Figure 5:
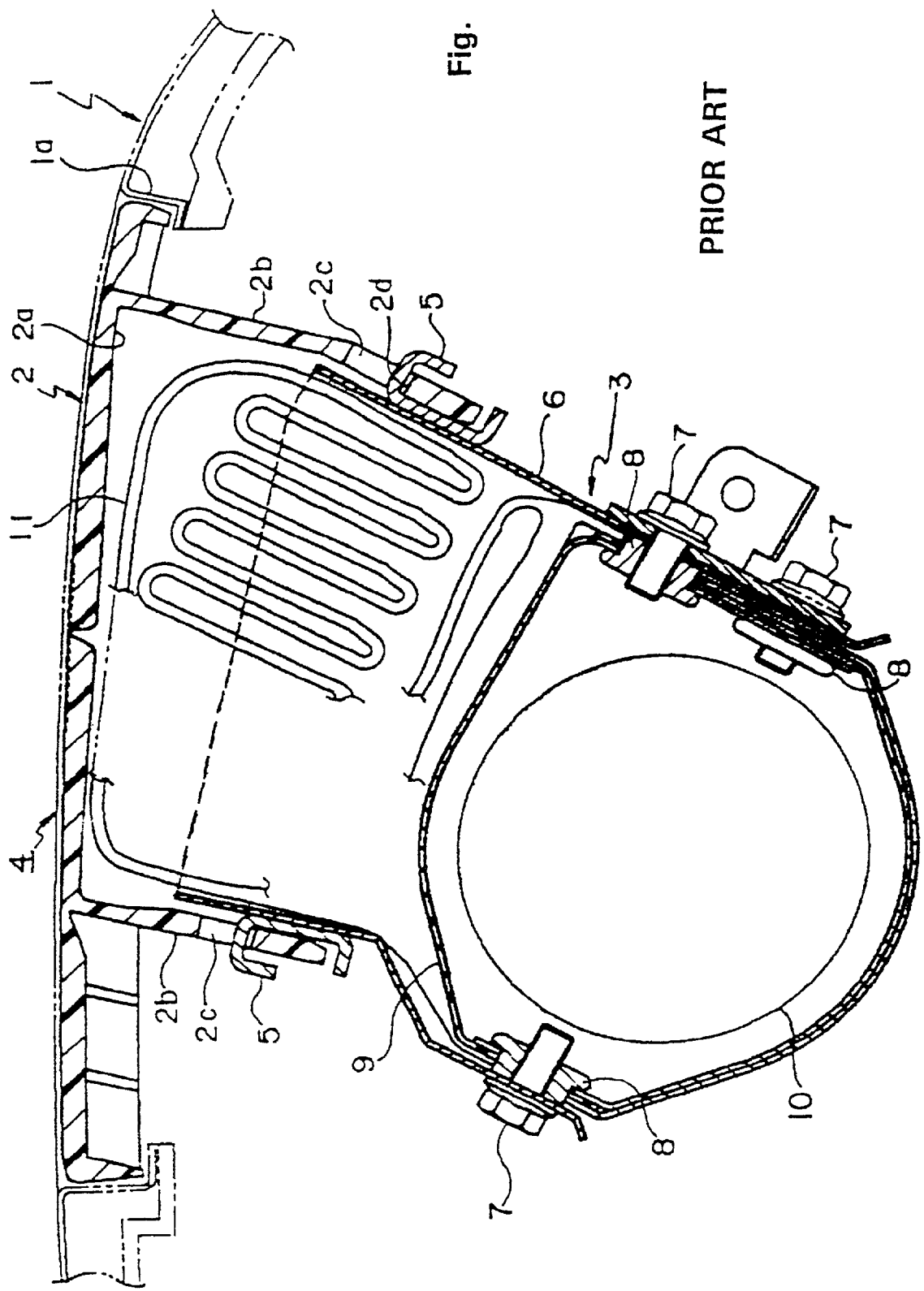
FIG. 5 is a cross-section view of a conventional automotive air bag device.

Next, elastic tongue pieces 22h, 22h are flexed outwardly while hooks 25a, 25a are passed through support openings 22g, 22g so that air bag activation unit 23 is temporarily fastened to lid 22. Then tongue pieces 22h, 22h are elastically restored so that the ends of the tongue pieces approach or come into contact with, and downwardly bias, hooks 25a, 25a, as shown in FIGS. 4(A), (B) and thereafter resist disengagement of hooks 25a, 25a from support openings 22g, 22g.

Figure 3B:
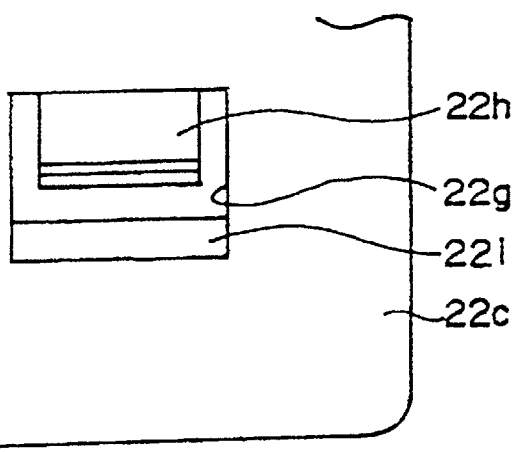
FIG. 3(B) is a second fragmentary, enlarged view of the attachment piece of FIGS. 1 and 2.

The assembled unit, comprising lid 22 and air bag activation unit 23, is transported to an automobile assembly plant or the like. It will be appreciated that, at this time, the end of tongue piece 22h is in contact with hook 25a, and lower edge 22i (FIG. 3B) of support opening 22g is in contact with hook 25a. Thus, hook 25a is interposed between attachment piece 22c and tongue piece 22h. This prevents disengagement or play between lid 22 and air bag activation unit 23 during transport to the automobile assembly plant and thereafter during automobile vibrations and the like.

The assembled unit is inserted from the front of instrument panel 21 through air bag inflation opening 21a. Engagement claws 22f and clips 24 hold lid 22 on instrument panel 21. Air bag activation unit 23 is fastened to the steering support member so that hook 25a engages lower edge 22i of support opening 22g.

Having described the presently preferred embodiment of the invention with reference to the accompanying drawings, it is to be understood that the invention is not limited to the precise embodiment described, and that various changes and modifications may be effected therein by one skilled in the art without departing from the scope or spirit of the invention as defined in the appended claims.

What is claimed is:

1. An automotive air bag device comprising:

a lid, adapted to cover an air bag inflation opening in an automotive panel member;

said lid having an attachment piece defining at least one support opening;

an air bag activation unit fastened to said lid;

said air bag activation unit having at least one hook member adapted for engagement with said at least one support opening;

an elastic tongue piece on a first edge of said at least one of said support openings;

said elastic tongue piece blocking said at least one hook member from disengagement from said at least one support opening; and said hook member resiliently displaces said tongue piece while said hook member is being engaged with said support opening.

2. An automotive air bag device according to claim 1, wherein said lid includes a thermoplastic material.

3. An automotive air bag device comprising:

a lid, adapted to cover an air bag inflation opening in an automotive panel member;

said lid having an attachment piece defining at least one support opening;

an air bag activation unit fastened to said lid;

said air bag activation unit having at least one hook member adapted for engagemnent with said at least one support opening;

an elastic tongue piece on a first edge of said at least one of said support openings;

said elastic tongue piece blocking said at least one hook member from disengagement from said at least one support opening; and said elastic tongue piece is biased against said at least one hook member when said hook member is engaged with said support opening.

4. The automotive air bag device of claim 3, wherein said tongue piece urges said hook member against a second edge of said support opening, said second edge of said support opening being opposite said first edge thereof.

5. An automotive air bag device according to claim 3, wherein said lid includes a thermoplastic material.

* * * * *